UNITED STATES PATENT OFFICE 2,533,233

ββ-DICYANOKETENE DIALKYL MERCAPTOLES AND METHOD FOR THEIR PREPARATION

Harry Derek Edwards and John David Kendall, Ilford, England, assignors to Ilford Limited, Ilford, England, a British company No Drawing. Application January 15, 1948, Serial No. 2,554. In Great Britain January 24, 1947

7 Claims. (Cl. 260—465.8)

This invention relates to the production of new organic compounds which are valuable intermediates for the production of organic compounds of commercial utility.

According to the present invention compounds of the general Formula I:

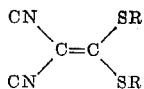

where R is an alkyl or aralkyl group are prepared by reacting carbon disulphide with the dry alkali-metal derivative of malodinitrile and alkylating or aralkylating the product with an alkyl or aralkyl salt or ester.

These compounds may be referred to as ββ-dicyano ketene dialkyl- or diaralkyl-mercaptoles.

The reaction with carbon disulphide can conveniently be effected with the malodinitrile in suspension in diethyl ether, though other inert solvents can be used. As alkali-metal, metallic sodium is the most convenient to use. Alkylation may be effected, for example, with methyl, ethyl and higher alkyl halides and the iodides are particularly suitable. Other alkylating agents which may be used are dialkyl sulphates, e. g. dimethyl sulphate and diethyl sulphate, alkyl p-toluene sulphonates, e. g. methyl or ethyl p-toluene sulphonates, or alkylene dihalides, e. g. ethylene dibromide and trimethylene dibromide. The alkyl group of the alkylating agent may be substituted so that other alkylating agents which may be used are chloracetic esters. Aralkylating agents are benzyl halides or sulphates.

The reaction with the carbon disulphide is best effected by allowing the reagents to stand together at room temperature and the alkylation or aralkylation is best effected by warming the reagents together.

According to a further feature of this invention a compound of general Formula I is reacted with an alkyl or aralkyl quaternary salt of a five-membered or six-membered heterocyclic nitrogen compound containing a reactive methylene group in α or γ position to the heterocyclic nitrogen atom, i. e. with a compound of the general Formula II:

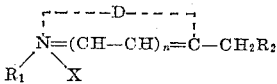

In this formula $R_1$ represents an alkyl or aralkyl group, e. g. methyl, ethyl, propyl, butyl or higher alkyl containing from 5 to 18 carbon atoms, benzyl and naphthylmethyl, $R_2$ represents a hydrogen atom or a hydrocarbon group, e. g. an alkyl or aralkyl group such as any of those listed in respect of $R_1$, or an aryl group such as phenyl or naphthyl, X represents an acid radicle, e. g. halide (chloride, bromide or iodide), sulphate, perchlorate or p-toluene sulphonate, D represents the residue of a five-membered or six-membered heterocyclic nitrogen ring, and $n$ is nought or 1. Typical ring systems which may be present are thiazole, oxazole, selenazole and the polycyclic members of these series, e. g. benzthiazole, benzoxazole and benzselenazole, thiazoline, selenazoline, oxazoline, pyridine, quinoline, lepidine and indolenine.

The reaction takes place with the elimination of the elements HX and RSH yielding products of the general Formula III:

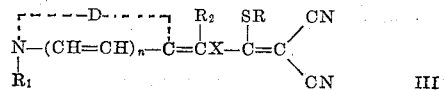

The reaction with the quaternary salt of the heterocyclic nitrogen compound is preferably effected in the presence of a base, e. g. pyridine, diethylamine, triethylamine or sodium acetate in ethyl alcohol.

The dyestuffs of general Formula III are sensitising dyes for photographic silver halide emulsions, and this invention includes silver halide photographic emulsions and particularly silver chloride, silver bromide, silver chlorobromide and silver iodobromide emulsions containing the said dyestuffs.

The following examples illustrate the invention:

EXAMPLE 1

*Preparation of ββ-dicyano ketene dimethyl mercaptole, of the formula*

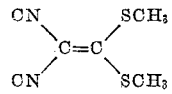

92 gms. of sodium were added to 1000 cc. of liquid ammonia in the presence of a small proportion of ferric nitrate as catalyst, and 132 gms. of malodinitrile was then added with stirring. The ammonia was allowed to evaporate over several hours and replaced with diethyl ether. 120 cc. of carbon disulphide was then added and the mixture allowed to stand for 2 weeks with occasional stirring. The resulting reaction mixture was refluxed with 240 cc. of methyl iodide for a week, and then filtered. The filtrate, on concentration by evaporation of the ether, deposited the product as a crystalline solid which, after recrystallisation from methyl alcohol solution, was obtained as colourless needles, m. pt. 80° C. Analysis for sulphur content: Found 38.10%; calculated 37.6%.

EXAMPLE 2

*Preparation of ββ-dicyano ketene diethyl mercaptole, of the formula*

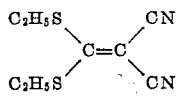

Sodamide was prepared by adding 20.4 gms. of sodium to 200 cc. of liquid ammonia in the presence of ferric nitrate as catalyst. 29.2 gms. of malodinitrile was added cautiously and the ammonia was allowed to evaporate and was replaced with diethyl ether. 30 cc. of carbon disulphide were then added and the reaction mixture was allowed to stand for two weeks with occasional stirring. 71 cc. of ethyl iodide were added to the reaction mixture and the whole boiled gently for two days and then allowed to stand for a week. The reaction mixture was then filtered and the ethereal filtrate was concentrated and distilled at 3 mm. pressure. A fraction boiling at 175° C. was collected. The sodium salts which remained from the filtration were covered with ether and treated with 24 cc. of ethyl alcohol and 40 cc. of ethyl iodide. A vigorous reaction ensued and on diluting the product with water, separating the ether extracts, drying these over anhydrous potassium carbonate and distilling them at 3 mm. pressure, a further yield was obtained of the product boiling at 175° C. The two distillates solidified on cooling and on recrystallisation from aqueous methyl alcohol yielded the product as colourless plates, m. pt. 37° C.

EXAMPLE 3

*Preparation of the compound of the formula*

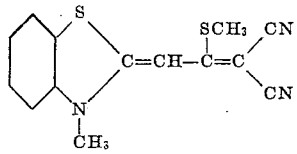

8.5 gms. of ββ-dicyano ketene diethyl mercaptole was fused at 100° C. for 2 hours with 7.5 gms. of 1-methyl benzthiazole and 9.3 gms. of methyl p-toluene sulphonate. Ten cc. of pyridine was added and the mixture boiled under reflux for 12 minutes. On pouring the reaction mixture into water the desired product separated. It was filtered off and recrystallised from methyl alcohol as shining purple crystals, m. pt. 201° C., giving a bright yellow solution in alcohol.

The dyestuff, incorporated in a gelatino silver iodobromide emulsion, extends the sensitivity of the emulsion to about 5500 Å., with a maximum sensitivity at about 5300 Å.

EXAMPLE 4

*Preparation of the compound of the formula*

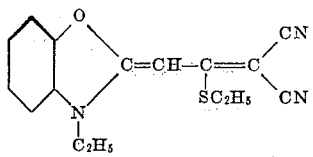

2.5 mols. of 2-methyl-benzoxazole ethiodide were boiled gently under reflux for 15 minutes in ethyl alcohol solution with 2½ mols. of ββ-dicyano ketene diethyl mercaptole and 5 mols. of triethylamine. On dilution with water the dye precipitated and on recrystallisation from methyl alcohol it was obtained as red crystals, m. pt. 151° C.

EXAMPLE 5

*Preparation of the compound of the formula*

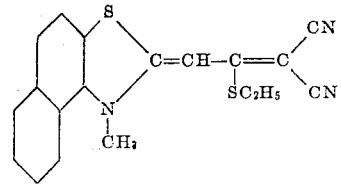

One mol. of 2-methyl-β-naphthathiazole and one mol. of methyl p-toluene sulphonate were fused together at 100° C. for 15 hours. One mol. of ββ-dicyano ketene diethyl mercaptole was added and the mixture boiled gently for half an hour under reflux with ethyl alcohol and one mol. of triethylamine. On pouring the reaction mixture into water the required dyestuff was precipitated. After separation and recrystallisation from ethyl alcohol it was obtained as crystals melting at 220° C.

This dyestuff was incorporated in a gelatino silver iodobromide emulsion and imparted a band of sensitivity extending to about 5900 Å. with a maximum at about 5500 Å.

EXAMPLE 6

*Preparation of the compound of the formula*

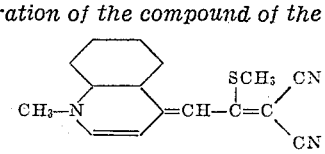

One mol. of ββ-dicyano ketene dimethyl mercaptole was boiled gently under reflux for 10 minutes in ethyl alcohol solution with one mol. of lepidine methiodide and one mol. of triethylamine. The mixture became a bright magenta colour and on dilution with water the required dyestuff precipitated out. On recrystallisation from benzene the dye was obtained as red needles with a blue reflex, m. pt. 221° C.

This dyestuff, when incorporated in a gelatino silver iodobromide emulsion, imparts a band of sensitivity extending to 5900 Å.

EXAMPLE 7

*Preparation of the compound of the formula*

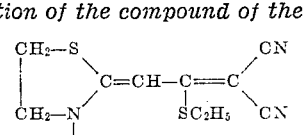

One mol. each of ββ-dicyano ketene diethyl mercaptole, 2-methylthiazoline and methyl p-toluene sulphonate were fused together at 100° C. for two hours. The mixture became yellow, ethyl alcohol was added and the whole boiled gently under reflux for 20 minutes with one mol. of triethylamine. The reaction mixture was then carefully diluted and allowed to stand for several hours during which the dyestuff crystallised out in long needles. On recrystallisation from methyl alcohol it was obtained as crystals melting at 161° C.

This dyestuff, when incorporated in a gelatino silver iodobromide emulsion, imparts a band of sensitivity extending to about 5300 Å. with a maximum at about 4700 Å.

EXAMPLE 8

*Preparation of the compound of the formula*

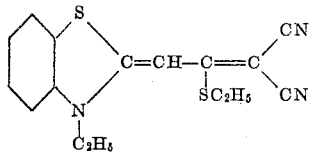

One mol. of 2-methyl benzthiazole ethiodide was boiled gently under reflux for 15 minutes in ethyl alcohol with one mol. of ββ-dicyano ketene diethyl mercaptole and 2 mols. of triethylamine. On dilution with water an oil separated and then hardened to give crystals of the product which, on recrystallisation from methyl alcohol, was obtained as mauve crystals with a green reflex, m. pt. 164° C.

This dyestuff, when incorporated in a gelatino silver iodobromide emulsion, imparts a band of sensitivity extending to 5500 Å. with a maximum at 5000 Å.

EXAMPLE 9

*Preparation of the compound of the formula*

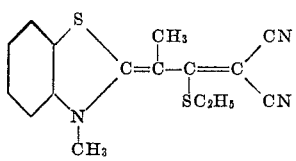

One mol. each of ββ-dicyano ketene diethyl mercaptole, 2-ethyl benzthiazole and methyl p-toluene sulphonate were fused together at 100° C. for 2 hours, the mixture becoming deep orange. A small amount of ethyl alcohol and one mol. of triethylamine were added and the mixture boiled gently under reflux for 15 minutes. On cooling and diluting with water the required product separated in red crystals with a gold reflex. On recrystallisation from ethyl alcohol, in which the product is only moderately soluble, the crystals of the product melting at 187° C. were obtained.

What we claim is:

1. A ββ-dicyano ketene dialkyl mercaptole.
2. A ββ-dicyano ketene dimethyl mercaptole.
3. A ββ-dicyano ketene diethyl mercaptole.
4. Process for the preparation of a β,β-dicyano ketene dialkyl mercaptole of the formula:

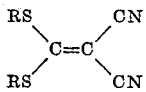

where R is an alkyl group, which comprises reacting carbon disulphide with the dry alkali-metal derivative of malodinitrile of the formula:

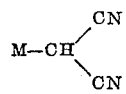

where M represents an atom of alkali-metal, and alkylating the product by treatment with an alkyl ester.

5. Process for the preparation of a β,β-dicyano ketene dialkyl mercaptole of the formula:

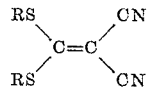

where R is an alkyl group, which comprises reacting carbon disulphide with the dry alkali-metal derivative of malodinitrile of the formula:

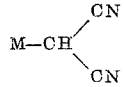

where M represents an atom of alkali-metal, in suspension in diethyl ether and alkylating the product by treatment with an alkyl ester.

6. Process for the preparation of a β,β-dicyano ketene dialkyl mercaptole of the formula:

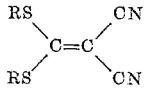

where R is an alkyl group, which comprises reacting carbon disulphide with the dry alkali-metal derivative of malodinitrile of the formula:

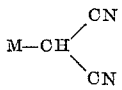

where M represents an atom of alkali-metal, in suspension in diethyl ether and alkylating the product by means of an alkyl halide.

7. Process for the preparation of a β,β-dicyano ketene dialkyl mercaptole of the formula:

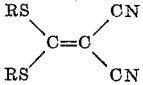

where R is an alkyl group, which comprises reacting carbon disulphide with the dry sodium derivative of malodinitrile of the formula:

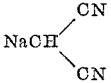

in suspension in diethyl ether and alkylating the product by treatment with an alkyl ester.

HARRY DEREK EDWARDS.
JOHN DAVID KENDALL.

REFERENCES CITED

The following references are of record in the file of this patent:

UNITED STATES PATENTS

| Number | Name | Date |
|---|---|---|
| 2,166,736 | White et al. | July 18, 1939 |
| 2,263,749 | White et al. | Nov. 25, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |

OTHER REFERENCES

Chemical Abstracts 16:3101 (abstract of Brit. Med. Journal, 1922, I, 514–515).

Chemical Abstracts 19:530 (abstract of Proc. Roy Soc., London, 96B, 317–333, 1924).